United States Patent [19]

McConnell et al.

[11] 4,299,933

[45] Nov. 10, 1981

[54] POLYESTER ADHESIVES

[75] Inventors: Richard L. McConnell; Jimmy R. Trotter; Bobby J. Sublett, all of Kingsport, Tenn.

[73] Assignee: Eastman Kodak Company, Rochester, N.Y.

[21] Appl. No.: 155,807

[22] Filed: Jun. 2, 1980

[51] Int. Cl.³ ............................................ C08L 67/00
[52] U.S. Cl. .................................. 525/170; 428/290; 525/176
[58] Field of Search ................. 525/176, 170; 428/290

[56] References Cited

U.S. PATENT DOCUMENTS 4,143,094  3/1979  Burzin et al. ..................... 525/176
4,155,952  5/1979  McConnell et al ................. 525/176

*Primary Examiner*—Jacob Ziegler
*Attorney, Agent, or Firm*—John A. Stevens; Daniel B. Reece, III

[57] ABSTRACT

Disclosed are compositions comprising a copolyester of
(A) at least one aromatic or saturated aliphatic or cycloaliphatic dibasic acid having 4 to 36 carbon atoms,
(B) from about 2 to about 40%, based on the weight of the copolyester, of a carboxylated polyolefin selected from the group consisting of (1) oxidized polyolefins and (2) the reaction product of
  (a) at least one homo or copolymer of an α- olefin having from 2 to 10 carbon atoms and
  (b) at least one unsaturated acid or anhydride having from 3 to 5 carbon atoms or a 1 to 10 carbon atom alkyl ester thereof, and
(C) at least one saturated aliphatic or cycloaliphatic glycol having from 2 to 12 carbon atoms, the copolyester having a crystalline melting point of about 70°–200° C. and an I.V. of about 0.2–1.6. These compositions are especially useful as coatings and adhesives.

12 Claims, No Drawings

POLYESTER ADHESIVES

This invention relates to new polyester compositions which contain carboxylated polyolefins as part of the dibasic acid moiety of the polymer. These polyesters are useful as adhesives and coatings.

BACKGROUND PRIOR ART

Copending application Ser. No. 55,091, filed July 5, 1979, U.S. Pat. No. 4,258,143, relates to modified unsaturated polyesters which are suitable for combining with conventional polymerizable, ethylenically unsaturated monomeric cross-linking agents such as styrene. These polyesters comprise the reaction product of
 (a) from about 50 to about 90% by weight (preferably about 50–85%), based on the weight of the reaction product, of an ethylenically unsaturated polyester derived from an $\alpha,\beta$-ethylenically unsaturated dicarboxylic acid with a saturated aliphatic polyol, and
 (b) from about 50 to greater than about 10% by weight (preferably about 50–15%), based on the weight of said reaction product, of a modified polyolefin derived by peroxide grafting of an $\alpha,\beta$-ethylenically unsaturated dicarboxylic acid or anhydride and a polyolefin.

These polyesters preferably contain a polymer or copolymer of an olefin as an additive.

U.S. Pat. No. 3,207,816 discloses that modification of low molecular weight reactive, essentially ethylenically unsaturated polyester resins, prior to cross-linking, by the addition thereto of an alternating copolymer of an $\alpha,\beta$-ethylenically unsaturated dicarboxylic acid or anhydride with a monoolefin having a terminal methylene group, results in linear alkyd resins having higher molecular weights than are readily obtainable by conventional procedures. However, these polymers would be expected to have an I.V. of generally no greater than 0.1. The resulting linear alkyd, due to its improved viscosity, is said to impart many outstanding advantages to polyester resinous compositions prepared therefrom. This patent further discloses, however, that the amount of interpolymer or mixture of interpolymer employed may be from about 0.05% to about 10%, preferably about 0.2% to about 3%, by weight based on the total weight of resin forming components.

DISCLOSURE OF INVENTION

The present invention provides a composition comprising a linear thermoplastic copolyester of
 (A) at least two aromatic or saturated aliphatic or cycloaliphatic dibasic acid having 4 to 36 carbon atoms,
 (B) from about 2 to about 40%, based on the weight of the copolyester, of a carboxylated polyolefin selected from the group consisting of (1) oxidized polyolefins and (2) the reaction product of
  (a) at least one homo or copolymer of an $\alpha$-olefin having from 2 to 10 carbon atoms and
  (b) at least one unsaturated acid or anhydride having from 3 to 5 carbon atoms or a 1 to 10 carbon atom alkyl ester thereof, and
 (C) at least one saturated aliphatic or cycloaliphatic glycol having from 2 to 12 carbon atoms,
the copolyester having a crystalline melting point of about 70°–200° C. and an I.V. of about 0.2–1.6.

Certain polyesters are known to be useful as adhesives for bonding fabrics and leather. It has been found that certain linear, thermoplastic polyesters derived from carboxylated polyolefins have excellent adhesive properties for fabrics, metals, plastics, leather, and wood. Also, the polymers may be extrusion coated or applied from solutions to provide coatings for fabrics, metals, plastics, leather and wood.

BEST MODE FOR CARRYING OUT THE INVENTION

According to the present invention, linear copolyesters which contain at least 2% by weight of one or more carboxylated polyolefins chemically combined in the polyester molecule are provided.

The polyesters generally contain crystallizable moieties with crystalline melting points of about 70° to about 200° C. These copolyesters are useful as coatings or as adhesives for bonding fabrics, metals, plastics, and wood.

The copolyesters are derived from at least one dibasic acid, a carboxylated polyolefin as part of the acid component, and at least one saturated glycol. The copolyesters have an inherent viscosity of about 0.2–1.6 when measured at 25° C. using 0.25 gram of copolyester per 100 ml. of a solvent consisting of 60 percent by weight phenol and 40 percent by weight tetrachloroethane.

The dibasic acid component comprises at least one aromatic or saturated aliphatic or cycloaliphatic dibasic acid having 4 to 36 carbon atoms. Preferred acids include isophthalic, 5-sulfoisophthalic, 1,4-cyclohexanedicarboxylic, 1,3-cyclohexanedicarboxylic, 1,2-cyclohexanedicarboxylic, glutaric, adipic, pimelic, suberic, azelaic, sebacic, 1,12-dodecandedioic, dimer acid and the like.

The carboxylated polyolefin used in the copolyester according to this invention accounts for about 2–40%, of the weight of the copolyester. The dibasic acid and carboxylated polyolefin together account for 100 mole percent of the acid component of the copolyester. The carboxylated polyolefin may be an oxidized polyolefin, or may be obtained by reacting a poly $\alpha$-olefin with about 5% by weight, based on the weight of the carboxylated polyolefin, of at least one unsaturated acid or anhydride having from 3 to 5 carbon atoms or a 1 to 10 carbon atom alkyl ester thereof.

Oxidized polyethylenes useful in the practice of this invention include those having a melt viscosity in the range of about 100 cp. to about 3500 cp. (measured at 125° C., in a Brookfield Thermosel Viscometer) and an acid number of about 4 to about 30 (ASTM-D-1386-59). These oxidized polyethylenes are prepared from thermally degraded polyethylenes prepared by conventional polymerization processes for preparing low, medium and high density polyethylene. These degraded polyethylenes are oxidized to prepare the oxidized polyethylene used in the present invention. The oxidized polyethylenes are well known in the art and methods for preparing such oxidized polyethylenes are well known and disclosed in the art. For example, U.S. Pat. No. 3,519,588 discloses oxidized polyethylenes useful in the present invention and methods of preparation.

Useful homo or copolymers of $\alpha$-olefins include low molecular weight polyethylene, crystalline polypropylene, amorphous polypropylene, mixtures of crystalline and amorphous polypropylene, poly-1-butene, and propylene copolymers with one or more higher $\alpha$-olefins. Useful higher $\alpha$-olefins include 1-butene, 1-pentene, 1-hexene, 1-heptene, 1-octene, 1-decene, and 4-methyl-1-pentene.

The α-olefins are reacted using conventional techniques with at least one unsaturated acid or anhydride having 3 to 5 carbon atoms or a 1–10 carbon atom ester thereof. Preferred acids, anhydride, or esters include maleic anhydride, dimethyl maleate, acrylic acid, methacrylic acid, and crotonic acid.

The glycol portion of the copolyester is a saturated aliphatic or cycloaliphatic glycol containing 2 to 12 carbon atoms. Preferred glycols include ethylene glycol, 1,3-propanediol, propylene glycol, 1,4-butanediol, 1,5-pentanediol, 1,6-hexanediol, 1,8-octanediol, 1,4-cyclohexanedimethanol, 1,3-cyclohexanedimethanol, 2,2-dimethyl-1,3-propanediol, 2,2,4,4-tetramethyl-1,3-cyclobutanediol, diethylene glycol, and the like.

The copolyesters according to this invention are readily prepared using typical polycondensation reaction conditions. They may be prepared by either batch or continuous processes.

Typical polyesterification catalysts which may be used include titanium alkoxides, dibutyl tin dilaurate, and combinations of zinc, manganese or magnesium acetates or benzoates with antimony oxide or antimony triacetate.

Useful polymers may have inherent viscosities ranging from about 0.2 to about 1.6, but preferred polymers have I.V. values ranging from about 0.25 to about 1.5.

It has generally been possible to include from about 2 to about 40 wt. % of the carboxylated polyolefins in the polyesters of this invention. Preferred concentrations of the polyolefin moiety would include from about 3 to about 30 wt. %. One of the advantages of these polyesters is that they can be used to bond fabrics at relatively low temperatures and the bonded fabrics have good resistance to typical laundering procedures. The polymers may be used in powder form for fusible interlining fabrics, applied in hot melt form from extruders or gear pump applicators, or extruded into film form for use in laminating or bonding substrates. The polymers may also be melt blown into nonwoven webs which may be used to laminate fabrics or other articles.

The following examples are submitted for a better understanding of the invention.

EXAMPLE 1

A total of 71.78 grams (0.37 moles) of dimethyl terephthalate, 59.0 grams (0.50 moles) of 1,6-hexanediol, 21.6 grams (0.24 moles) of 1,4 butanediol, 10 grams of maleated low-viscosity, low density polyethylene (saponification number 5; density 0.908; melt viscosity 8500 cp at 150° C.), and 100 ppm of titanium catalyst [2.37 ml of titanium isopropoxide catalyst solution in n-butanol (0.51 wt. % titanium)] are weighed into a 500 ml single-neck round-bottom flask equipped with a nitrogen inlet, stirrer, vacuum outlet and a condensing flask. The flask is heated at 200° C. in a Belmont metal bath for one hour with a nitrogen sweep over the reaction mixture. After one hour, the temperature of the bath is increased to 215° C. for one hour, then to 225° C. for 32 minutes. When the theoretical amount of methanol has distilled from the reaction mixture, the metal bath temperature is increased to 260° C. and the pressure in the flask is reduced to about 0.1–0.5 mm of mercury. The flask is heated at 260° C. at about 0.1 mm pressure for 1 hr. and 15 min. The flask is then removed from the bath and is allowed to cool under a nitrogen atmosphere as the polyester crystallizes. Analysis of the polymer by NMR indicates that it is a poly(hexamethylene terephthalate) copolyester containing 20 mole % of 1,4-butanediol and 10 wt. % maleated polyethylene. The polymer is an opaque, white color and it has an I.V. of 0.70.

The polymer has a melt viscosity of 311,900 cp at 190° C. (by ASTM D1238 method). By DSC analysis, the polymer has a glass transition temperature (Tg) of 15° C. and melting points (Tm) of 100° and 129° C. [combined heats of fusion ($\Delta H_f$) for both endotherms is 8.4 cal/g.].

The above material is readily dissolved in methylene chloride. Films (3–4 mils when dry) of the material are cast from the methylene chloride solution. The films are white and opaque and are very flexible. The films are used to bond 65/35 polyester/cotton fabric (twill weave) using a Sentinel heat sealer at 150° C. and 15 psi for 4 sec. The bonded specimens have an initial T-peel strength of 11.5 lb./in.-width [measured at 23° C. (after bonds have aged for 24 hrs. at 23° C.) using a peel rate of two inches per minute]. After laundering bonds at 60° C. (140° F.) for either 5 or 20 cycles, the bonds have T-peel strengths of 7.5 lb./in.-width. Films are also used to bond 100% woven polyester fabric. The bond strength on this fabric is 13.7 lb./in.

A sample of the copolymer is melt blown onto a steel mandrel to provide a non-woven web of adhesive having a weight of 20 g/yd$^2$. This non-woven web is used to bond 65/35 polyester/cotton fabric to itself in a Sentinel heat sealer at 160° C.

EXAMPLE 2

The general procedure of Example 1 is repeated except that 20 g of the maleated, low-viscosity, low-density polyethylene (see Example 1) is used. NMR analysis indicates that the polymer is a poly(hexamethylene terephthalate) copolyester containing 20 mole % 1,4-butanediol and 20 wt. % of maleated polyethylene. The polymer is an opaque, white color and has an I.V. of 0.54. The polymer has a melt viscosity of 218,500 cp at 190° C. (by ASTM D1238 method). By DSC analysis, the polymer has a Tg of 14° C. and Tm values of 101° and 129° C. (total $\Delta H_f$ = 6.6 cal/g.). Fabric bonds made with films of this polymer on polyester/cotton fabric (bonding conditions = 150° C./4 sec./15 psi) have initial T-peel strengths of 12.9 lb./in.-width. T-peel strengths of 7.0 and 6.5 lb./in.-width respectively, are obtained after laundering fabric bonds for 5 and 20 cycles at 60° C. On 100% woven polyester fabric, a bond strength of 10.5 lb./in. is obtained.

Similarly good results are obtained when the above type of copolyester is made using 18 grams of maleated polyethylene and 2 grams of oxidized, low-viscosity, low density polyethylene (density 0.942; acid number 15; melt viscosity 900 cp at 125° C.) instead of 20 g of maleated polyethylene.

EXAMPLE 3

A total of 54.32 g (0.28) moles of dimethyl terephthalate, 17.23 g (0.0888) moles of dimethyl isophthalate, 59 g (0.50) moles of 1,6-hexanediol, 21.60 g (0.24) moles of 1,4-butanediol, 10 g of maleated low-viscosity, low density polyethylene (saponification number 5; density 0.908; melt viscosity 8500 cp at 150° C.) and 100 ppm titanium catalyst [2.37 ml of titanium isopropoxide catalyst solution in n-butanol (0.51 wt. % titanium)] are weighed into a 500 ml single-neck round-bottom flask equipped with a nitrogen inlet, stirrer, vacuum outlet, and a condensing flask. The flask is heated at 200° C. in a Belmont metal bath for one hour with a nitrogen sweep over the reaction mixture. After one hour, the temperature is increased to 210° C. for one hour, then to 225° C. for 32 minutes. When the theoretical amount of methanol has distilled from the reaction mixture, the metal bath temperature is increased to 260° C. and the pressure in the flask is reduced to about 0.1–0.5 mm of mercury. The flask is heated at 260° C. at about 0.1 mm pressure for 1 hr. and 15 min. The flask is then removed from the bath and is allowed to cool under a nitrogen atmosphere as the polyester crystallizes.

NMR analysis of the polymer indicates it to be a poly(hexamethylene terephthalate) copolyester containing 20 mole % isophthalic acid, 20 mole % 1,4-butanediol, and 10 wt. % of maleated polyethylene.

The polymer is an opaque, white color. It has an I.V. of 0.68 and a melt viscosity of 253,300 cp at 190° C. (by ASTM D1238 method). By DSC analysis, the polymer has a Tg of 13° C. and a Tm of 97° C. (total $\Delta H_f = 7.6$ cal/g). Using the procedure in Example 1, films (3–4 mils thick) of the polymer are made. Fabric bonds made with the films of this polymer on polyester/cotton fabric (bonding conditions = 150° C./4 sec./15 psi) have initial T-peel strengths of 15.4 lb./in.-width. After laundering fabric bonds for 5 and 20 cycles at 60° C. bond T-peel strengths of 9.9 and 8.4 lb./in.-width, respectively, are obtained. On 100% woven polyester fabric, a bond strength of 19.6 lb./in. is obtained.

A sample of the copolyester is cryogenically ground and sieved to provide <70 mesh powders. The powder is mixed with 0.1 wt. % calcium stearate powder. This powder is coated onto cotton backing fabric using a small powder point roll applicator and the dots of powder are fused under infrared heaters to provide a fusible interlining fabric with adhesive coating weight of 18 g/yd². Samples of this interlining are fused to a polyester face fabric in a Sentinel heat sealer at 150° C./4.5 psi/15 sec. The laminated fabrics retain good bond strength after 5 cycles of laundering.

EXAMPLE 4

The procedure of Example 3 is repeated except that 20 g of the maleated, low-viscosity, low density polyethylene is used. NMR analysis of the polymer indicates it to be a poly(hexamethylene tetephthalate) copolyester containing 20 mole % isophthalic acid, 20 mole % 1,4-butanediol, and 20 wt. % maleated polyethylene. The polymer is an opaque, white color. It has an I.V. of 0.64 and a melt viscosity of 200,400 cp at 190° C. (by ASTM D1238 method). By DSC analysis, the polymer has a Tg of 14° C. and a Tm of 101° C. ($\Delta H_f = 7.9$ cal/g). Fabric bonds made with films of this polymer on polyester/cotton fabric (bonding conditions = 150° C./4 sec./15 psi) have initial T-peel strengths of 11.4 lb./in.-width. After laundering fabric bonds for 5 and 20 cycles at 60° C., bond T-peel strengths of 10.3 and 7.6 lb./in.-width, respectively, are obtained. On 100% woven polyester fabric, a bond strength of 15.9 lb./in. is obtained.

Similarly good results are obtained when the above type of copolyester is made using 17 grams of maleated polyethylene and 3 g of oxidized, low-viscosity, high density polyethylene (density 0.964; acid number 18; 250 cp at 150° C.) instead of 20 g of maleated polyethylene.

EXAMPLE 5

The general procedure of Example 1 is repeated except that dimethyl terephthalate, dimethyl adiphate, maleated low-viscosity, low density polyethylene (saponification number 5; density 0.908; melt viscosity 4000 cp at 150° C.), ethylene glycol and 1,4-butanediol are used to make a poly(ethylene terephthalate) copolyester containing 24 mole % adipic acid, 26 mole % 1,4-butanediol and 15 wt. % maleated polyethylene. This copolyester shows Tm values of 97° C. and 142° C. by DSC analysis. Films are used to bond 65/35 polyester/cotton twill fabric and peel strengths of 19.6 lb./in are obtained. This copolyester is also extruded from a Killion extruder and the molten bead of adhesive is used to seam 65/35 polyester/cotton sheeting fabric. Pillowcases and bed sheets made in this manner are laundered 5 and 20 cycles in 140° F. water and the seams are still intact at the end of these treatments.

EXAMPLE 6

The general procedure of Example 1 is repeated except that dimethyl terephthalate, dimethyl azelate, maleated, low-viscosity, high density polyethylene (saponification number 6; density 0.965; melt viscosity 850° cp at 190° C.) and 1,4-butanediol are used to make a poly(butylene terephthalate) copolyester containing 31 mole % azelaic acid and 5 wt. % maleated high density polyethylene. It has a DSC Tm value of 176° C. Films of this copolyester are used to make good bonds on polyester fabric and the bonds have good laundry resistance.

EXAMPLE 7

The general procedure of Example 1 is repeated except that dimethyl terephthalate, dimethyl sebacate, maleated, low-viscosity amorphous polypropylene (saponification number 6; density 0.86; melt viscosity 1000 cp at 190° C.) are used to make a poly(hexamethylene terephthalate) copolyester containing 16 mole % sebacic acid and 3 wt. % maleated amorphous polypropylene. This copolyester has a DSC Tm value of 131° C. Films of this adhesive are used to prepare bonds on 65/35 polyester/cotton twill fabric. Similarly good results are achieved when a maleated 60/40 propylene/1-butene copolymer are used instead of maleated amorphous polypropylene.

The "heat of fusion", $\Delta H_f$ of polymers is the amount of heat absorbed when crystallizable polymers are melted. $\Delta H_f$ values are readily obtained using Differential Scanning Calorimeters (Perkin-Elmer). For example, one method for determining $\Delta H_f$ is described in *Journal of Applied Polymer Science*, 20, 1209 (1976). Measurement of $H_f$ is also described in duPont Thermal Analysis Bulletin No. 900-8 (1965). Qualitatively, it is possible to compare the degree of crystallinity of polymers by comparing their $H_f$ values. Crystalline melting ponts (Tm) and glass transition temperatures (Tg) are also obtained from the Differential Scanning Calorimeter (DSC).

The T-peel bond strength is obtained on samples of brown kraft paper which have been bonded with the adhesive composition using an Instron Tester and 2 inches/minute peel rate. The strength of the bonds is determined by the so-called "Peel Test" based on a modification of the ASTM "T-Peel Test" set forth on pages 63 and 64 of the 1964 edition of the BOOK OF ASTM STANDARDS, published by the American Society for Testing Materials, and more specifically identified as Test Number D-1876-61-T.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. A composition comprising a copolyester of
   (A) at least one aromatic or saturated aliphatic or cycloaliphatic dibasic acid having 4 to 36 carbon atoms.
   (B) from about 2 to about 40%, based on the weight of the copolyester, of a carboxylated polyolefin selected from the group consisting of (1) oxidized polyolefins and (2) the reaction product of
      (a) at least one homo or copolymer of an α-olefin having from 2 to 10 carbon atoms and
      (b) at least one unsaturated acid or anhydride having from 3 to 5 carbon atoms or a 1 to 10 carbon atom alkyl ester thereof, and
   (C) at least one saturated aliphatic or cycloaliphatic glycol having from 2 to 12 carbon atoms, and
   said copolyester having a crystalline melting point of about 70°–200° C. and an I.V. of about 0.2–1.6.

2. A composition according to claim 1 wherein the carboxylated polyolefin accounts for about 3–30% by weight of the copolyester.

3. A composition according to claim 1 wherein the carboxylated polyolefin is an oxidized polyolefin.

4. A composition according to claim 1 wherein the carboxylated polyolefin is the reaction product of said homo- or copolymer of an α-olefin and said unsaturated acid or anhydride.

5. A composition according to claim 1 wherein said aromatic or saturated aliphatic or cycloaliphatic dibasic acid is selected from the group consisting of isophthalic, 5-sulfoisophthalic, 1,4-cyclohexanedicarboxylic, 1,3-cyclohexanedicarboxylic, 1,2-cyclohexanedicarboxylic, glutaric, adipic, pimelic, suberic, azelaic, sebacic, 1,12-dodecandedioic, and dimer acid.

6. A composition according to claim 1 wherein said unsaturated acid, or anhydride having from 3 to 5 carbon atoms or ester thereof is selected from the group consisting of maleic anhydride, dimethyl maleate, acrylic acid, methacrylic acid, and crotonic acid.

7. A composition according to claim 1 wherein said glycol is selected from the group consisting of ethylene glycol, propylene glycol, 1,4-butanediol, 1,5-pentanediol, 1,6-hexanediol, 1,8-octanediol, 1,4-cyclohexanedimethanol, 1,3-cyclohexanedimethanol, 2,2-dimethyl-1,3-propanediol, 2,2,4,4-tetramethyl-1,3-cyclobutanediol and diethylene glycol.

8. A composition according to claim 1 wherein the I.V. is about 0.2–1.5.

9. A composition comprising a copolyester of
   (A) at least one dibasic acid selected from the group consisting of isophthalic, 5-sulfoisophthalic, 1,4-cyclohexanedicarboxylic, 1,3-cyclohexanedicarboxylic, 1,2-cyclohexanedicarboxylic, glutaric, adipic, pimelic, suberic, azelaic, sebacic, 1,12-dodecandedioc, and dimer acid,
   (B) from about 3 to about 30%, based on the weight of the copolyester, of an oxidized polyolefin and
   (C) at least one saturated aliphatic or cycloaliphatic glycol having from 2 to 12 carbon atoms, and
   said copolyester having a crystalline melting point of about 70°–200° C. and an I.V. of about 0.2–1.5.

10. A composition comprising a copolyester of
    (A) at least one dibasic acid selected from the group consisting of isophthalic, 5-sulfoisophthalic, 1,4-cyclohexanedicarboxylic, 1,3-cyclohexanedicarboxylic, 1,2-cyclohexanedicarboxylic, glutaric, adipic, pimelic, suberic, azelaic, sebacic, 1,12-dodecandedioc, and dimer acid,
    (B) from about 3 to about 30%, based on the weight of the copolyester, of the reaction product of
       (a) at least one homo or copolymer of an α-olefin having from 2 to 10 carbon atoms and
       (b) at least one unsaturated acid or anhydride having from 3 to 5 carbon atoms or a 1 to 10 carbon atom alkyl ester thereof, and
    (C) at least one saturated aliphatic or cycloaliphatic glycol having from 2 to 12 carbon atoms, and
    said copolyester having a crystalline melting point of about 70°–200° C. and an I.V. of about 0.2–1.5.

11. A substrate having coated thereon the composition of claim 1.

12. A substrate having coated thereon the composition of claim 10.

* * * * *